United States Patent
Liang et al.

(10) Patent No.: US 9,225,726 B2
(45) Date of Patent: Dec. 29, 2015

(54) METHODS FOR SUPPORTING USER EQUIPMENT ACCESSING LOCAL IP SERVICES AND APPARATUS THEREFOR

(75) Inventors: Huarui Liang, Beijing (CN); Hong Wang, Beijing (CN); Lixiang Xu, Beijing (CN)

(73) Assignee: Samsung Electronics Co., Ltd (KR)

( * ) Notice: Subject to any disclaimer, the term of this patent is extended or adjusted under 35 U.S.C. 154(b) by 832 days.

(21) Appl. No.: 13/362,876

(22) Filed: Jan. 31, 2012

(65) Prior Publication Data
US 2012/0195299 A1    Aug. 2, 2012

(30) Foreign Application Priority Data

Jan. 31, 2011  (CN) .......................... 2011 1 0036062

(51) Int. Cl.
*H04L 29/06* (2006.01)
*H04W 12/08* (2009.01)
*H04W 48/02* (2009.01)
*H04W 8/18* (2009.01)
*H04W 48/20* (2009.01)

(52) U.S. Cl.
CPC ............. *H04L 63/104* (2013.01); *H04W 12/08* (2013.01); *H04W 48/02* (2013.01); *H04W 8/186* (2013.01); *H04W 48/20* (2013.01)

(58) Field of Classification Search
None
See application file for complete search history.

(56) References Cited

U.S. PATENT DOCUMENTS

| 2010/0169498 | A1  | 7/2010 | Palanki et al. |
| 2010/0272013 | A1  | 10/2010 | Horn et al. |
| 2011/0045826 | A1* | 2/2011 | Kim et al. .................. 455/426.1 |
| 2011/0170517 | A1* | 7/2011 | Bakker et al. .................. 370/331 |
| 2011/0171915 | A1* | 7/2011 | Gomes et al. .................... 455/73 |
| 2012/0057574 | A1* | 3/2012 | Horn ............................. 370/338 |
| 2012/0189016 | A1* | 7/2012 | Bakker et al. ................. 370/401 |

FOREIGN PATENT DOCUMENTS

WO    WO 2010/128773    11/2010

* cited by examiner

*Primary Examiner* — Christine Duong
(74) *Attorney, Agent, or Firm* — The Farrell Law Firm, P.C.

(57) ABSTRACT

Methods and apparatus are provided for supporting Local IP Access (LIPA) services to a User Equipment (UE). A network node receives a request for accessing a PDN which is identified by an APN of a service access point, from the UE. The network node determines whether the UE is permitted to access LIPA services via a CSG base station based on LIPA accessibility information. The network node determines whether requirements for connecting the UE to the LIPA services are met based on the LIPA accessibility information and device capabilities of a serving base station of the UE, when the UE is permitted to access the LIPA services. The LIPA services are activated for the UE, when the requirements for connecting the UE to the LIPA services are met.

16 Claims, 6 Drawing Sheets

METHODS FOR SUPPORTING USER EQUIPMENT ACCESSING LOCAL IP SERVICES AND APPARATUS THEREFOR

PRIORITY

This application claims a priority under 35 U.S.C. 119(a) to a Chinese Patent Application filed in the Chinese Intellectual Property Office on Jan. 31, 2011 and assigned Serial No. 201110036062.4, the content of which is incorporated herein by reference.

BACKGROUND OF THE INVENTION

1. Field of the Invention

The present invention relates generally to wireless communication, and more particularly, to a method for supporting a User Equipment (UE) accessing Local Internet Protocol Access (LIPA) services.

2. Description of the Related Art

FIG. 1 is a diagram illustrating a structure of a System Architecture Evolution (SAE) system.

As shown in FIG. 1, a UE 101 is a terminal device for receiving data. An Evolved Universal Terrestrial Radio Access Network (E-UTRAN) 102 is a wireless access network, and includes an evolved Node B (eNB), which provides the UE 101 with a wireless network access interface. A Mobile Management Entity (MME) 103 manages a mobility context, a session context and security information of the UE 101. A Serving GateWay (SGW) 104 is primarily used to provide user plane functions, and the MME 103 and the SGW 104 may be located within the same physical entity. A Packet Data Network Gateway (PGW) 105 performs functions that include, for example, charging and lawful interception, and may be located within the same physical entity as the SGW 104. A Policy and Charging Rule Function (PCRF) 106 provides Quality of Service (QoS) policies and charging rules. The PGW 105 and the PCRF 106 are connected to an operator service network 107. A Serving General Packet Radio Service (GPRS) Supporting Node (SGSN) 108 is a network node device providing routing for data transmission in a Universal Mobile Telecommunications System (UMTS). A Home Subscriber Server (HSS) 109 is the home subscriber subsystem of UE 101. The HSS 109 protects user information including, for example, the current position of the user device, the address of the serving node, user security information, packet data context of the user device and so on.

In order to provide better service for a specific user group in a mobile communication system, multiple wireless resource management entities are usually grouped to form a Closed Subscriber Group (CSG) for the specific user group. A wireless resource management entity is a network entity for managing wireless resources and providing user device access to a wireless access network, such as, base stations in various mobile communication systems.

All users within an enterprise or a school may form a specific user group, and multiple wireless resource management entities may be grouped to form a CSG that provides dedicated access services for the specific user group.

Home eNB/Home Node B (HeNB/HNB) has been defined in current $3^{rd}$ Generation Partnership Project (3GPP) subscriber systems, including, for example, open HeNB/HNB, closed HeNB/HNB and hybrid HeNB/HNB. Open HeNB/HNB does not specify any user group, and can be accessed by any user device. Closed HeNB/HNB, which is also referred to as CSG HeNB/HNB, is the HeNB/HNB in the CSG described above. CSG HeNB/HNB only permits access to user devices in a specific user group served by the CSG HeNB/HNB. A the user permitted to access a CSG is referred to as a CSG member, and a user that is not permitted to access the CSG is referred to as a non-CSG member. When Hybrid HeNB/HNB and another HeNB/HNB form a CSG, it not only permits access for the CSG member, but also permits access for the non-CSG member.

With the increased data rate for UE services, operators have provided a new technique: Selected IP Traffic Offload (SIPTO), which hands over a UE, which is in motion and is accessing a specific service, to an access point closer to the wireless access network. This hand over remarkably reduces costs of the transportation network and provides a better service experience for services with higher data rates.

3GPP proposed that a network should enable both SIPTO and LIPA.

With respect to SIPTO, when a UE accesses the Internet or other public networks via an HeNB, HNB or eNodeB/NodeB, the network may select or re-select a user plane node that is closer to the wireless access network. With respect to LIPA, a UE accesses a home network or an enterprise network via a HeNB/HNB. In a LIPA implementation, a user plane node that is closer to the HeNB/HNB, or that is in the HeNB/HNB access network may be selected or re-selected for the UE. The user plane node may be a device in the core network or a gateway. Specifically, the user plane node may be an SGW, a PGW or a Local GateWay (LGW) in the SAE system, or may be an SGSN or a Gateway GPRS Support Node (GGSN) in the UMTS system.

The network makes a determination as to whether to activate LIPA services for a UE based on UE subscription information and device capabilities of the serving base station of the UE.

The UE subscription information may include, for example, a LIPA permission parameter and a list of CSGs accessible by the UE. The LIPA permission parameter has three possible values, including LIPA_Only, LIPA_Conditional and LIPA_Prohibit.

LIPA_Only indicates that only LIPA services can be activated for the UE. When any requirement for activating the LIPA service is not met according to the UE subscription information and the device capabilities of the serving base station of the UE, the network rejects the LIPA service request of the UE.

LIPA_Prohibit indicates that the UE is not permitted to access the LIPA services. When the UE initiates a LIPA service request, if the UE subscription information is LIPA_Prohibit, the network then rejects the LIPA service request of the UE.

LIPA_Conditional indicates that when the UE initiates the LIPA service request via other base stations (e.g., a non-accessible HeNB/HNB or an eNB of the UE) and the UE subscription parameter is LIPA_Conditional, the network may select a proper PGW for the UE according to a conventional PGW selection method.

The list of CSGs accessible by the UE may include an identity of each CSG accessible by the UE and information of an Access Point Name (APN) corresponding to each CSG. Based on the combination of the above information, the network is able to determine whether the UE is permitted to access the LIPA services.

Regarding the device capabilities of the serving base station of the UE, during the process of requesting the activation of LIPA services, if an initial UE message sent to a MME by the base station includes an IP address of an LGW, it is determined that the serving base station of the UE has LIPA abilities. Otherwise, if an initial UE message does not include an IP address of an LGW, it is determined that the serving base station of the UE does not have LIPA abilities.

FIG. 2 is a diagram illustrating a method of determining whether LIPA services are to be activated for the UE.

Referring to FIG. 2, the UE requests access to the Packet Data Network (PDN) (or APN), or more specifically, the UE requests activation of the LIPA services, in step 201. The HSS identifies the list of CSGs accessible by the UE and the LIPA parameter of the APN, and identifies whether the HeNB/HNB supports the LIPA services. The list of CSGs accessible by the UE includes information on an APN accessible by LIPA services corresponding to each CSG, and the LIPA parameter of the APN includes LIPA-Only, LIPA-Prohibit, and LIPA-Conditional.

In step 203, it is determined whether the UE is a CSG member based on the information. When the UE is a CSG member the methodology proceeds to step 204. When the UE is not a CSG member the methodology proceeds to step 205.

In step 204, it is determined whether the APN is within the list of CSGs, and whether the HeNB has LIPA capabilities. The APN parameter is also determined. Further, it is determined whether to activate LIPA services according to results of the determinations.

Specifically, when the serving base station (HeNB/HNB) is in the list of CSGs accessible to the UE, when the APN requested to be accessed by the UE is the APN corresponding to the CSG, when the device capabilities of the serving base station support LIPA, and when a LIPA permission parameter of the APN requested to be accessed by the UE is LIPA-Only or LIPA-Conditional, the MME activates LIPA services for the UE.

In step 205, the APN parameter is determined and a response to the LIPA request is made according to the parameter. Specifically, when the serving base station of the UE does not support LIPA, and when the LIPA permission parameter of the APN requested by the UE is LIPA-Only or LIPA-Prohibit, the MME then rejects activation of the LIPA services for the UE.

If the serving base station of the UE does not support LIPA and the LIPA permission parameter of the APN requested by the UE is LIPA-Conditional, the MME then selects a proper PGW for the UE according to conventional PGE selection methods.

Accordingly, a UE can only access the LIPA services via a specified CSG HeNB/HNB as a CSG member. When the UE is not a CSG member, the UE can not access the LIPA services via a CSG HeNB/HNB. For example, when a UE accesses a hybrid HeNB/HNB and the UE does not belong to the CSG, LIPA services will not be activated for the UE when the UE accesses the HeNB/HNB as a non-CSG member.

SUMMARY OF THE INVENTION

The present invention has been made to address at least the above problems and/or disadvantages and to provide at least the advantages described below. Accordingly, an aspect of the present invention provides a method which enables a UE to access LIPA services via a base station which is not in a list of accessible CSGs, such as a HeNB in hybrid mode, or a base station in open mode.

In accordance with an aspect of the present invention, a method is provided for supporting LIPA services to a UE. A network node receives a request for accessing a PDN which is identified by an APN of a service access point, from the UE. The network node determines whether the UE is permitted to access LIPA services via a CSG base station based on LIPA accessibility information. The network node determines whether requirements for connecting the UE to the LIPA services are met based on the LIPA accessibility information and device capabilities of a serving base station of the UE, when the UE is permitted to access the LIPA services. The LIPA services are activated for the UE, when the requirements for connecting the UE to the LIPA services are met.

In accordance with another aspect of the present invention, an apparatus is provided for supporting LIPA services to the UE. The apparatus includes a receiver for receiving a request for access to a PDN identified by an APN of a service access point from a UE. The apparatus also includes a determinator for determining whether the UE is permitted to access LIPA services via a CSG based on LIPA accessibility information by a network node, and determining whether requirements for connecting the UE to the LIPA services are met based on the LIPA accessibility information and device capabilities of a serving base station of the UE when the UE is permitted to access the LIPA services. The apparatus further includes an activator for activating the LIPA services for the UE when the requirements of connecting the UE to the LIPA services are met.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
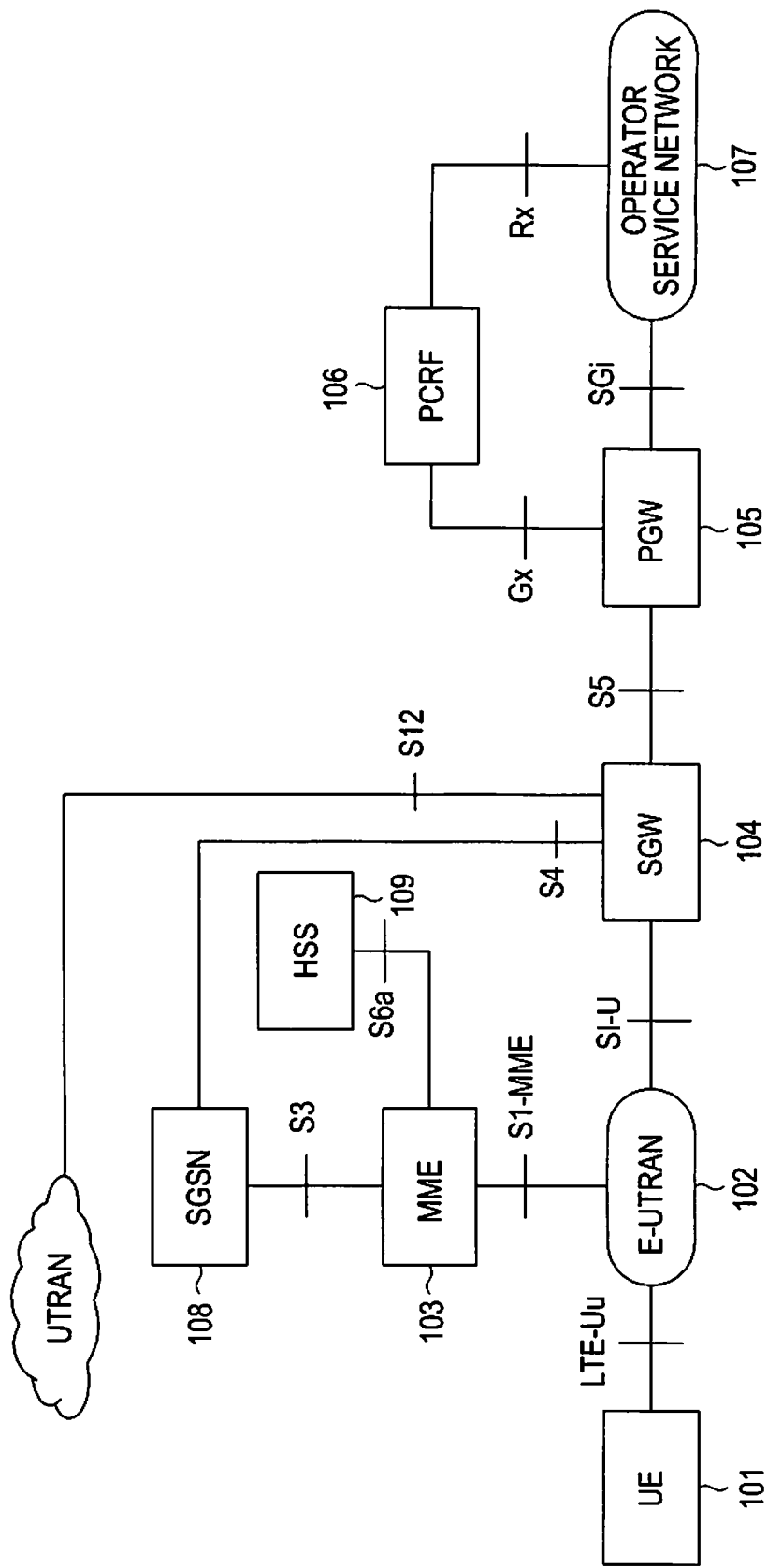
FIG. 1 is a diagram illustrating a structure of an SAE system.
Figure 2:
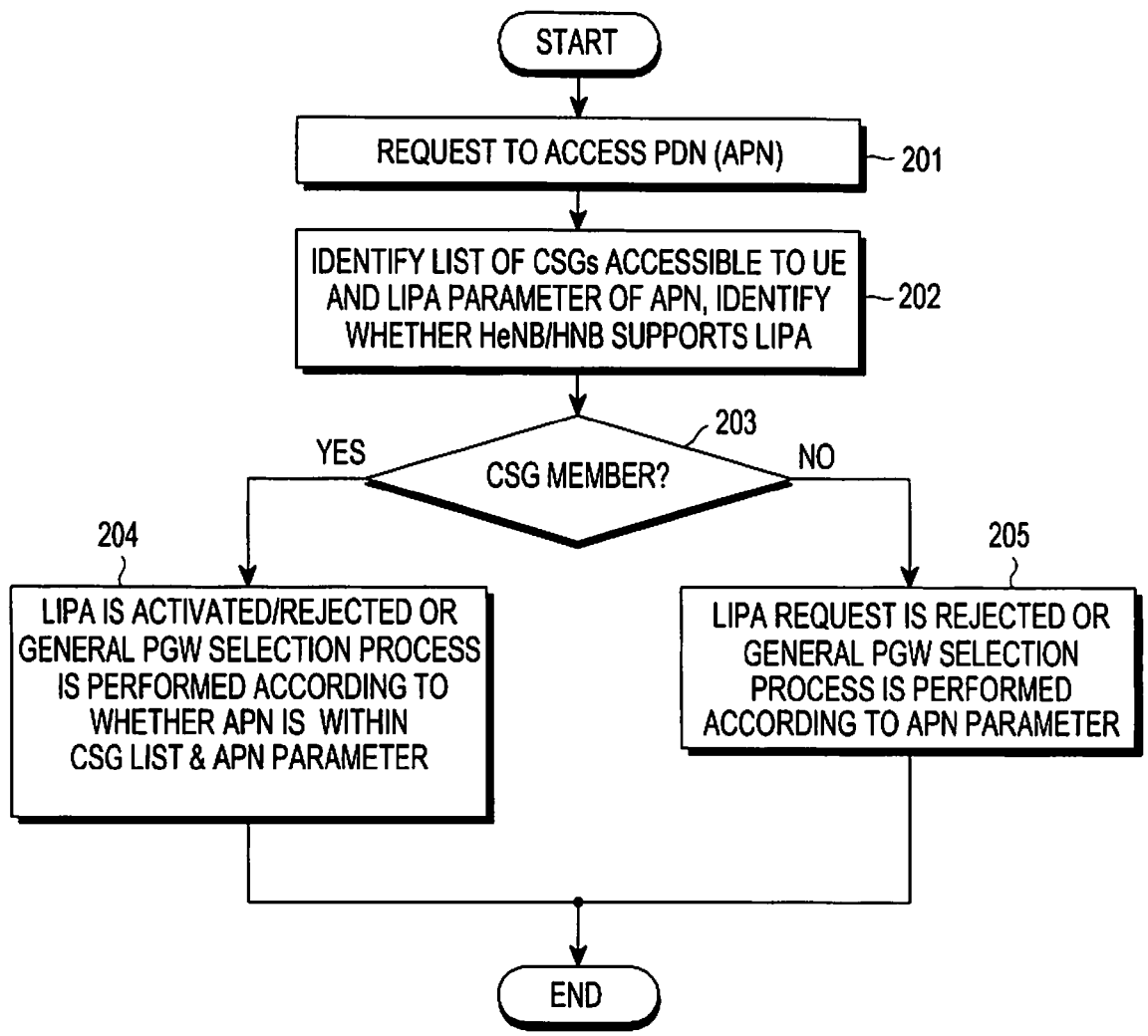
FIG. 2 is a flowchart illustrating an operation of the network in determining whether to activate LIPA services.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention provide a method for supporting a UE accessing LIPA services.

Figure 3:
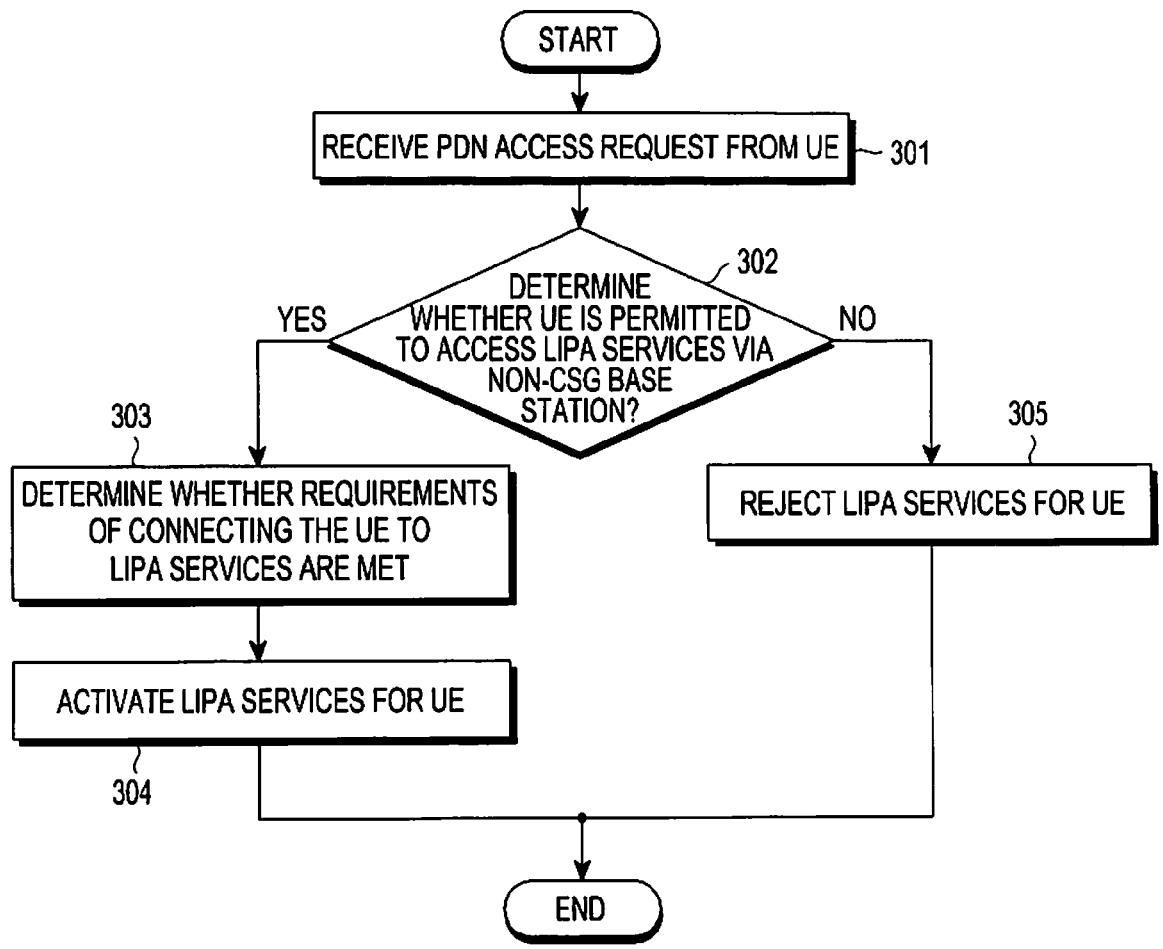
FIG. 3 is a flowchart illustrating a method for supporting UE accessing LIPA services, according to an embodiment of the present invention.

FIG. 3 is a flowchart illustrating a method for supporting a UE accessing LIPA services, according to an embodiment of the present invention.

In step 301, a network node receives a PDN access request, which is sent by a UE. The PDN is identified by an APN.

In step 302, the network node determines whether the UE is permitted to access LIPA services via a non-CSG base station based on LIPA accessibility information. When the UE is permitted to access LIPA services, the methodology proceeds to step 303.

In step 303, the network node determines whether requirements for connecting the UE to the LIPA services are met based on LIPA accessibility information and device capabilities of a serving base station of the UE. LIPA services are activated for the UE when the requirements are met, in step 304.

When it is determined, in step 302, that the UE is not permitted to access LIPA services via the non-CSG base station, the request for LIPA services for the UE is rejected, in step 305.

Figure 4:
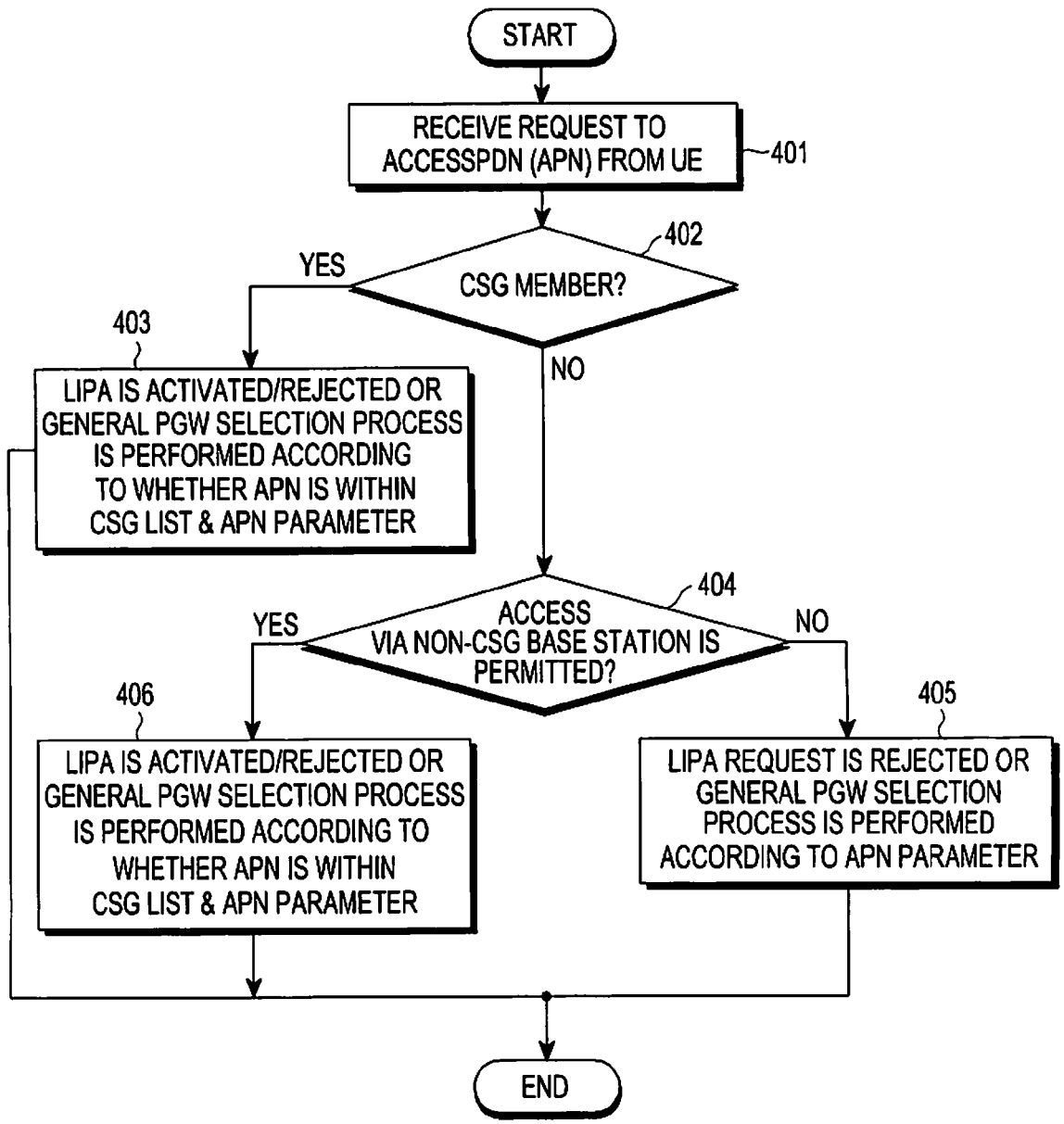
FIG. 4 is a flowchart illustrating a process of a network determining whether to activate LIPA services, according to an embodiment of the present invention.

FIG. 4 is a flowchart illustrating a method of determining whether to activate LIPA services, according to an embodiment of the present invention.

In step 401, a PDN access request is received an MME/SGSN from a UE. The PDN is identified by an APN.

In step 402, the network node MME/SGSN determines whether the UE is a CSG member based on LIPA accessibility information. When the UE is a CSG member, the methodology proceeds to step 403. When the UE is not a CSG member, the methodology proceeds to step 404.

In step 403, LIPA services are activated according to whether the APN is within the list of CSGs, whether the HeNB has LIPA capabilities, and according to the APN parameter. Specifically, the MME/SGSN activates LIPA services for the UE if a list of CSGs accessible to the UE includes the APN, if the HeNB supports the LIPA services, and if a LIPA accessibility permission parameter of the APN is LIPA-Only or LIPA-Conditional. The MME/SGSN rejects activation of LIPA services for the UE if the list of CSGs accessible to the UE includes the APN, if the HeNB supports the LIPA services, and if the LIPA accessibility permission parameter of the APN is LIPA-Prohibit.

Further, if the list of CSGs accessible to the UE does not include the APN from block 401 and the LIPA accessibility permission parameter of the APN is LIPA_Conditional, the network selects a proper PGW for the UE according to conventional PGW selection methods, as long as the APN is in the LIPA accessibility information. With the exception of the above situations, the network node MME/SGSN rejects activation of LIPA services for the UE.

In step 404, the MME/SGSN determines whether the UE is permitted to access LIPA services via a non-CSG base station. When the UE is not permitted, the MEE/SGSN proceeds to step 405. When the UE is permitted, the MME/SGSN proceeds to step 406. The non-CSG base station refers to a hybrid HeNB/HNB, an open HeNB/HNB or an eNB.

In step 405, the MME/SGSN rejects activation of LIPA services for the UE. Specifically, if the LIPA permission parameter of the APN is LIPA-Only or LIPA-Prohibit, the network node MME/SGSN rejects activation of LIPA services for the UE. If the LIPA permission parameter of the APN is LIPA-Conditional, the MME/SGSN selects a suitable PGW for the UE according to conventional PGW selecting methods only when the APN is in LIPA accessibility information.

In step 406, the activation of LIPA services is determined according to whether the APN is within the CSG list and according to the APN parameter. Specifically, when the serving base station of the UE supports LIPA, the MME/SGSN activates LIPA services for the UE when the LIPA accessibility information includes the APN and the LIPA accessibility permission parameter of the APN is LIPA-Only or LIPA-Conditional. Further, when the serving base station of the UE supports LIPA, the MME/SGSN rejects activation of LIPA services for the UE when the LIPA accessibility information includes the APN and the LIPA permission parameter of the APN is LIPA-Prohibit.

When the serving base station of the UE does not support LIPA, the MME/SGSN may select a PGW according to conventional PGW selecting methods when the LIPA accessibility information includes the APN and the LIPA permission parameter of the APN is LIPA-Conditional.

In the above process, the MME/SGSN may store the LIPA accessibility information for determining whether to activate the LIPA services for the UE. Specifically, the LIPA accessibility information may include:

1) Information of an APN accessible to the UE;

2) A list of CSGs, which includes an identity of a CSG accessible to the UE and information of an APN corresponding to the CSG. The information of the APN may include information of an APN providing LIPA and/or information of an APN not providing LIPA corresponding to the CSG accessible to the UE;

3) LIPA permission parameter of an APN, whose value may be one of: LIPA-Only, LIPA-Prohibit, LIPA-Conditional; and 4) An identity indicating whether access to a non-CSG base station is permitted. The identity is for indicating whether the network permits a UE to access non-CSG base stations, such as a hybrid HeNB, or an open HeNB, or an eNB, instead of CSG base stations. When the UE accesses a HeNB in hybrid mode, the UE may access as a non-CSG user.

The LIPA accessibility information may be the UE subscription information sent to the MME/SGSN by an HSS, or configured in the MME/SGSN by the network.

In addition, the network entity HeNB/HNB also provides the network node MME/SGSN with a parameter indicating whether the HeNB/HNB supports LIPA. For example, in R-10, a HeNB/HNB indicates that it supports LIPA by sending a LGW IP address to the MME/SGSN. In R-11, the above manner or other manners may be adopted to inform the MME/SGSN. For example, the HeNB/HNB may send an identity indicating LIPA is supported, to the MME/SGSN.

In an alternate embodiment of the present invention, the network may further determine whether the APN currently requested to be accessed supports LIPA, in addition to determining whether the LIPA accessibility information includes the APN when the network permits UE accessing LIPA services through base stations of other types. Only when the LIPA accessibility information includes the APN and the APN supports LIPA, is the type of the APN checked to make the determination as to whether to provide LIPA services for the UE.

According to an embodiment of the present invention, in step 406, when the MME/SGSN determines that the UE is permitted to access a non-CSG base station, and based on the premise that the serving base station of the UE supports LIPA and LIPA accessibility information includes the APN and the APN supports LIPA, the MME/SGSN activates the LIPA services when the LIPA accessibility permission parameter of the APN is LIPA-Only, rejects activation of the LIPA services for the UE when the LIPA permission parameter of the APN is LIPA-Prohibit, and activates the LIPA services for the UE when the LIPA accessibility permission parameter of the APN is LIPA-Conditional. When the serving base station of the UE does not support LIPA, the MME/SGSN may select a suitable PGW according to conventional PGW selecting methods when the LIPA accessibility information includes the APN and the LIPA permission parameter of the APN is LIPA-Conditional. With the exception of the above situations, the network rejects activation of the LIPA services for the UE.

Figure 5:
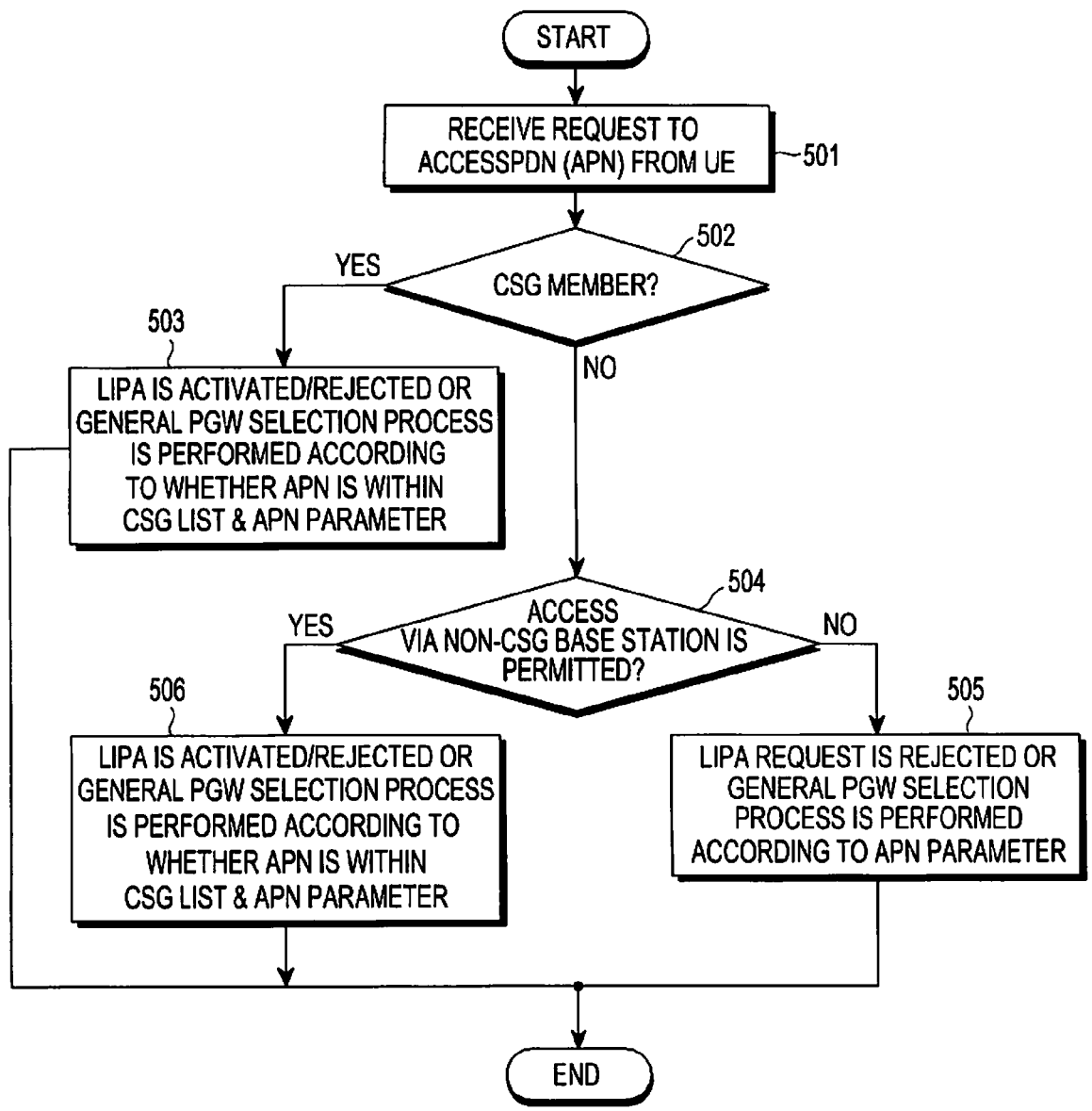
FIG. 5 is a flowchart illustrating a process of a network determining whether to activate LIPA services, according to another embodiment of the present invention.

FIG. 5 is a flowchart illustrating a method of determining whether to activate LIPA services, according to another embodiment of the present invention.

In step 501, a PDN access request is received at a MME/SGSN from a UE. The PDN is identified by an APN.

In step 502, the MME/SGSN determines whether the UE is a CSG member based on LIPA accessibility information. When the UE is a CSG member, the methodology proceeds to step 503. When the UE is not a CSG member, the methodology proceeds to step 504.

In step 503, LIPA services are activated according to whether the APN is within the CSG list, whether the HeNB has LIPA capabilities, and according to the APN parameter. Specifically, when the serving base station of the UE supports LIPA, the MME/SGSN activates LIPA services for the UE if a list of CSGs accessible to the UE includes the APN and a LIPA permission parameter of the APN is LIPA-Only or LIPA-Conditional. When the serving base station of the UE support LIPA, the MME/SGSN rejects activation of LIPA services for the UE if the list of CSGs accessible to the UE includes the APN and the LIPA accessibility permission parameter of the APN is LIPA-Prohibit.

Further, if the list of CSGs accessible to the UE does not include the APN and the LIPA permission parameter of the APN is LIPA-Conditional, the MME/SGSN selects a proper PGW for the UE according to conventional PGW selection methods as long as the APN is in the LIPA accessibility information. With the exception of the above situations, the MME/SGSN rejects activation of LIPA services for the UE.

In step 504, the MME/SGSN determines whether the UE is permitted to access a non-CSG base station. When the UE is not permitted, the MME/SGSN proceeds to step 505. When the UE is permitted, the MME/SGSN proceeds to step 506. The non-CSG base station refers to a hybrid HeNB/HNB, an open HeNB/HNB or an eNB.

In step 505, the MME/SGSN rejects activation of LIPA services for the UE. Specifically, if the LIPA permission parameter of the APN is LIPA-Only or LIPA-Prohibit, the network node MME/SGSN rejects activation of LIPA services for the UE. If the LIPA permission parameter of the APN is LIPA-Conditional, the network node MME/SGSN selects a suitable PGW for the UE according to conventional PGW selecting methods, when the APN is in LIPA accessibility information.

In step 506, it is determined whether LIPA services are activated according to whether the APN supports the LIPA and according to the APN parameter. Specifically, on the premise that the APN supports LIPA and the serving base station of the UE supports LIPA, the MME/SGSN activates LIPA services for the UE when the LIPA accessibility permission parameter of the APN is LIPA-Only, rejects activation of the LIPA services for the UE when the LIPA permission parameter of the APN is LIPA-Prohibit, and activates the LIPA services for the UE when the LIPA permission parameter of the APN is LIPA-Conditional.

When the APN is in the LIPA accessibility information, the LIPA permission parameter of the APN is LIPA-Conditional, and the base station does not support LIPA, the MME/SGSN selects a suitable PGW for the UE according to conventional PGW selection methods.

The MME/SGSN may store the LIPA accessibility information for determining whether to activate the LIPA services for the UE. Specifically, the LIPA accessibility information may include:

1) Information of an APN accessible to the UE, which may include information of an APN that supports LIPA;

2) A list of CSGs accessible to the UE, which includes an identity of a CSG accessible to the UE and information of an APN corresponding to the CSG. The information of an APN may include information of an APN providing a LIPA corresponding to the CSG accessible to the UE;

3) LIPA permission parameter of an APN, whose value may be one of: LIPA-Only, LIPA-Prohibit, LIPA-Conditional; and 4) An identity indicating whether access to a non-CSG base station is permitted. The identity is for indicating that the network permits a UE to access non-CSG base stations, such as a hybrid HeNB, or an open HeNB, or an eNB, instead of CSG base stations. When the UE accesses an HeNB in hybrid mode, the UE may access as a non-CSG base station.

The above information may be UE subscription information sent to the MME/SGSN by an HSS, or configured in the MME/SGSN by the network.

In addition, the network entity HeNB/HNB also provides the network node MME/SGSN with a parameter indicating whether the HeNB/HNB supports LIPA. For example, in R-10, an HeNB/HNB indicates that it supports LIPA by sending a LGW IP address to the MME/SGSN. In R-11, the above manner or other manners may be adopted to inform the MME/SGSN. For example, the HeNB/HNB may send an identity indicating LIPA is supported to the MME/SGSN.

In the above-described embodiments of the present invention, when activating LIPA services for the UE, the MME/SGSN may select an LGW for the UE based on an LGW IP address provided by a home base station or an eNB, instead of according to conventional PGW selecting methods.

In the above-described embodiments of the present invention, part of the information stored by the MME/SGSN may be sent by an HSS. The UE subscription information sent by the HSS may be as shown in Table 1 below, which is part of the UE subscription information. Table 1 only lists information related to embodiments of the present invention are listed. The UE subscription information may be sent to the MME/SGSN after the UE is attached to the network, and the MME/SGSN may store the information.

TABLE 1

| content | description |
| --- | --- |
| APN | An identity according to DNS naming conventions, indicates the name of an access point to the PDN. This parameter also indicates whether the APN supports LIPA. |
| CSG list | CSG list is a list of CSG IDs under each VPLMN. Each CSG ID has a corresponding living time, and within the living time, the CSG ID is valid. If there is no corresponding living time, the subscription information has no limit. Each CSG ID may access a specific PDN using a local IP. Each CSG ID corresponds to one or more APNs. |
| LIPA permission parameter | Indicates the current PDN that provides local IP access. It has three values: LIPA-Only, LIPA-Prohibit, and LIPA-Conditional. |
| LIPA accessibility via a non-CSG base station | yes/no |

When the parameter "LIPA accessibility via a non-CSG base station" included in the UE subscription information is set to be "yes", the UE is permitted to access LIPA services via a non-CSG base station. When the parameter is set to be "no", the UE is not permitted to access LIPA services via a non-CSG base station. Non-CSG base stations include eNB, open HeNB/HNB, and hybrid HeNB/HNB. Therefore, the UE may access LIPA services as a non-CSG user.

Figure 6:
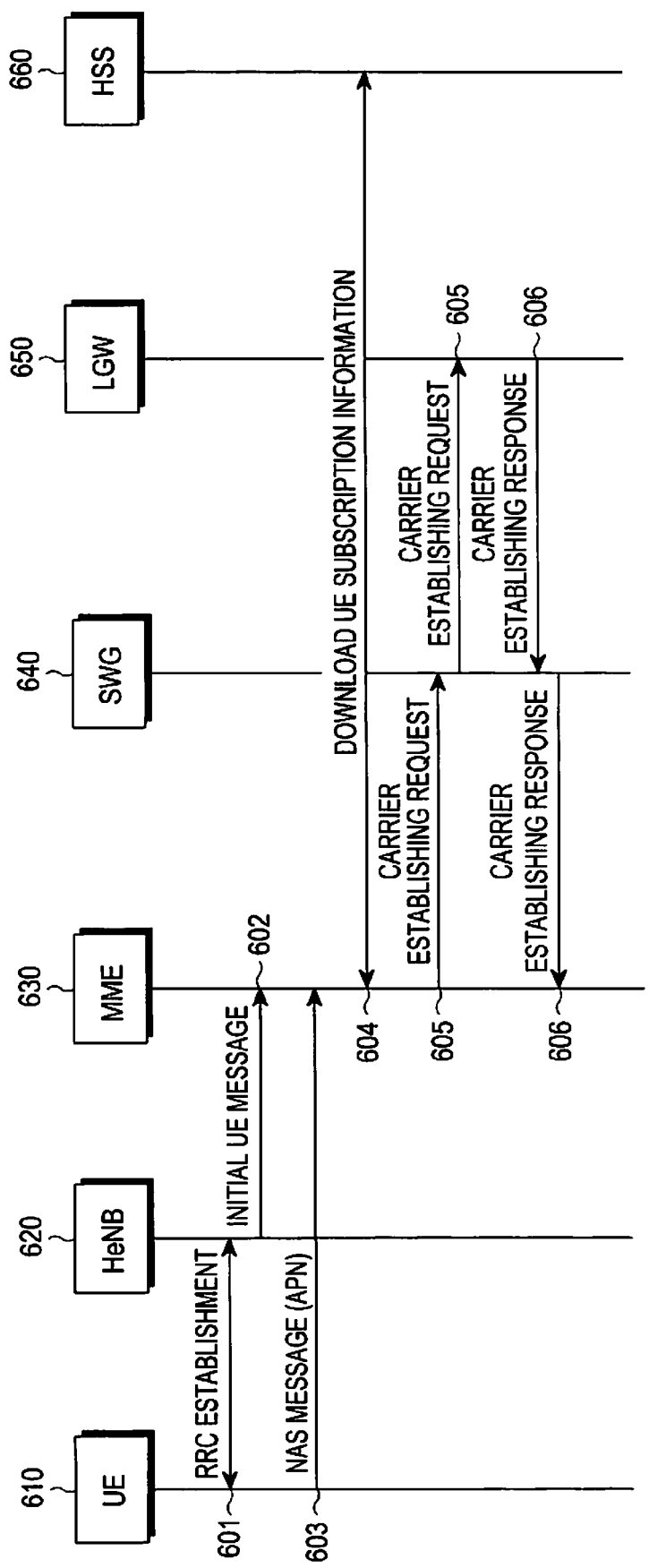
FIG. 6 is a flowchart illustrating a process of implementing the determination of whether to activate LIPA services, according to an embodiment of the present invention.

FIG. 6 is a flowchart illustrating a process of implementing the determination of whether to activate LIPA services, according to an embodiment of the present invention. The flowchart is illustrated by taking an HeNB as a home base station, and an MME downloads UE subscription information of UEs via an HSS. The process may include the following procedures.

In step 601, an RRC establishment process between a UE 610 and an HeNB 620 is performed.

In step 602, the HeNB 620 sends an initial UE message to a MME 630.

In step 603, the UE 610 sends a Non Access Stratum (NAS) message to the MME 630. The NAS message includes information on the APN requested to be accessed by the UE 610. Specifically, the NAS message may be a PDN connection request or an initial attach message.

In step 604, the MME 630 downloads UE subscription information via an HSS 660. When the UE is requesting a PDN connection, processing in step 604 is omitted because the MME has downloaded the UE subscription information in the initial attach process.

The MME 630 selects a proper LGW or PGW for the UE, according to a method provided by an embodiment of the present invention.

According to embodiments of the present invention, if the network node MME/SGSN decides to activate LIPA services for the UE, the MME 630 selects an LGW for the UE, and establishes a carrier to the LGW for the UE through steps 605 and 606.

If the MME 630 performs a conventional PGW selection process, the MME 630 selects a suitable PGW for the UE and performs subsequent processing according to conventional methods.

Otherwise, the MME 630 rejects the current service request.

In another embodiment of the present invention, information indicating whether a UE is permitted to access LIPA services via a base station of other types is part of configuration information of the MME/SGSN.

If the configuration information permits a UE to access LIPA via a non-CSG base station, the network determines whether the APN requested to be accessed by the UE is in the subscription information, permits activation of LIPA when the APN is in the subscription information, and rejects the LIPA service request when the APN is not in the subscription information.

If the configuration information of the MME permits the UE to access LIPA via a non-CSG base station, the network determines whether the APN requested to be accessed by the UE is a LIPA-accessible APN. If the APN is a LIPA-accessible APN, the network permits LIPA activation. If the APN is not a LIPA-accessible APN, the network rejects the LIPA service request. For example, a network operator defines a special LIPA APN for LIPA services, and configures information of the special APN in the MME/SGSN as part of configuration information of the network node. When the UE requests to access LIPA via a base station of other types, when the information of the APN requested to be accessed by the UE is consistent with the configuration information and the MME/SGSN permits the UE to access LIPA via a non-CSG base station, the MME/SGSN activates LIPA services for the UE. The network operator defines a special LIPA APN for LIPA services, and information of the special APN is set as part of subscription information. When the UE requests to access LIPA via a base station of other types, if the information of the APN requested to be accessed by the UE is consistent with the LIPA APN and the MME/SGSN permits the UE to access LIPA via a non-CSG base station, the MME/SGSN activates LIPA services for the UE.

In view of the foregoing, methods for supporting a UE accessing LIPA services according to embodiments of the present invention extends the scope of the application of LIPA services, and enables a UE to access LIPA services via a non-CSG base station.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for supporting Local Internet Protocol (IP) Access (LIPA) services to a User Equipment (UE), comprising the steps of:
   receiving, by a network node, a request for accessing a Packet Data Network (PDN) which is identified by an Access Point Name (APN), from the UE;
   determining, by the network node, whether the UE is permitted to access LIPA services via a non-Closed Subscriber Group (CSG) base station based on LIPA accessibility information;
   determining, by the network node, whether requirements for connecting the UE to the LIPA services via the non-CSG base station are met based on the LIPA accessibility information and device capabilities of a serving base station of the UE, when the UE is permitted to access the LIPA services via the non-CSG base station; and
   activating the LIPA services via the non-CSG base station for the UE, when the requirements for connecting the UE to the LIPA services via the non-CSG base station are met.

2. The method as claimed in claim 1, wherein the LIPA accessibility information comprises information on an APN accessible by the UE, a list of CSGs accessible by the UE, a LIPA parameter for accessing the APN accessible by the UE, and information on whether the UE is permitted to access the non-CSG base station, and
   wherein the LIPA accessibility information is configured by the network node, or is subscription information of the UE.

3. The method as claimed in claim 2, wherein the list of CSGs accessible by the UE comprises at least one of information on an APN providing LIPA services and information on an APN not providing LIPA services for each CSG.

4. The method as claimed in claim 2, wherein the information of the APN accessible by the UE comprises the APN accessible by the UE and information on whether the APN accessible by the UE provides LIPA services, and wherein the list of CSGs comprises information on an APN providing LIPA services for each CSG.

5. The method as claimed in claim 2, wherein the information on whether the UE is permitted to access the non-CSG base station is used by the network node in determining whether the UE is permitted to access the LIPA services via the non-CSG base station.

6. The method as claimed in claim 3, wherein determining whether the requirements for connecting the UE to the LIPA services via the non-CSG base station are met comprises:
   when the device capabilities of the serving base station of the UE support the LIPA services via the non-CSG base station, determining that the requirements for connecting the UE to the LIPA services via the non-CSG base station are met if the LIPA accessibility information comprises the APN requested to be accessed by the UE and if the LIPA parameter of the APN is LIPA-Only or LIPA-Conditional, and determining that the requirements for connecting the UE to the LIPA services via the non-CSG base station are not met and an activation of the LIPA services via the non-CSG base station for the UE is rejected if the LIPA accessibility information comprises the APN requested to be accessed by the UE and if the LIPA parameter of the APN is LIPA-Prohibit, and when the device capabilities of the serving base station of the UE do not support the LIPA services via the non-CSG base station, determining that the requirements for connecting the UE to the LIPA services via the non-CSG base station are not met and a PDN GateWay (PGW) for the UE is selected if the LIPA accessibility information comprises the APN requested to be accessed by the UE and if the LIPA parameter of the APN is LIPA-Conditional.

7. The method as claimed in claim 4, wherein determining whether the requirements for connecting the UE to the LIPA services via the non-CSG base station are met comprises:

when the device capabilities of the serving base station of the UE support the LIPA services via the non-CSG base station, when the LIPA accessibility information comprises the APN requested to be accessed by the UE, and when the APN supports the LIPA services via the non-CSG base station, determining that the requirements for connecting the UE to the LIPA services via the non-CSG base station are met if the LIPA parameter of the APN is LIPA-Only or LIPA-Conditional, and determining that the requirements for connecting the UE to the LIPA services via the non-CSG base station are not met and an activation of the LIPA services via the non-CSG base station for the UE is rejected if the LIPA parameter of the APN is LIPA-Prohibit, and when the device capabilities of the serving base station of the UE do not support the LIPA services via the non-CSG base station, determining that the requirements for connecting the UE to the LIPA services via the non-CSG base station are not met and a PGW for the UE is selected if the LIPA accessibility information comprises the APN requested to be accessed by the UE and if the LIPA parameter of the APN is LIPA-Conditional.

8. The method as claimed in claim 4, wherein determining whether the requirements for connecting the UE to the LIPA services via the non-CSG base station are met comprises:

when the device capabilities of the serving base station of the UE support the LIPA services via the non-CSG base station and the APN requested to be accessed by the UE supports the LIPA services via the non-CSG base station, determining that the requirements for connecting the UE to the LIPA services via the non-CSG base station are met if the LIPA parameter of the APN is LIPA-Only or LIPA-Conditional, and determining that the requirements for connecting the UE to the LIPA services via the non-CSG base station are not met and an activation of the LIPA services via the non-CSG base station for the UE is rejected if the LIPA parameter of the APN is LIPA-Prohibit; and when the LIPA accessibility information comprises the APN and the LIPA parameter of the APN is LIPA-Conditional, determining that the requirements for connecting the UE to the LIPA services via the non-CSG base station are not met and a PGW for the UE is selected if the device capabilities of the serving base station of the UE do not support the LIPA services via the non-CSG base station.

9. An apparatus for supporting Local Internet Protocol (IP) Access (LIPA) services to a User Equipment (UE), comprising:

a receiver for receiving a request for an access to a Packet Data Network (PDN) identified by an Access Point Name (APN), from the UE; and a controller for determining whether the UE is permitted to access LIPA services via a non-Closed Subscriber Group (CSG) base station based on LIPA accessibility information, determining whether requirements for connecting the UE to the LIPA services via the non-CSG base station are met based on the LIPA accessibility information and device capabilities of a serving base station of the UE when the UE is permitted to access the LIPA services via the non-CSG base station, and activating the LIPA services via the non-CSG base station for the UE when the requirements for connecting the UE to the LIPA services via the non-CSG base station are met.

10. The apparatus as claimed in claim 9, wherein the LIPA accessibility information comprises information on an APN accessible by the UE, a list of CSGs accessible by the UE, a LIPA parameter for accessing the APN accessible by the UE, and information on whether the UE is permitted to access the non-CSG base station, and wherein the LIPA accessibility information is configured by the network node, or is subscription information of the UE.

11. The apparatus as claimed in claim 10, wherein the list of CSGs accessible by the UE comprises at least one of information on an APN providing LIPA services and information on an APN not providing LIPA services for each CSG.

12. The apparatus as claimed in claim 10, wherein the information of the APN accessible by the UE comprises the APN accessible by the UE and information on whether the APN accessible by the UE provides LIPA services, and wherein the list of CSGs comprises information on an APN providing LIPA services for each CSG.

13. The apparatus as claimed in claim 10, wherein the controller determines whether the UE is permitted to access the LIPA services via the non-CSG base station by using information on whether the UE is permitted to access the non-CSG base station.

14. The apparatus as claimed in claim 11, wherein:

when the device capabilities of the serving base station of the UE support the LIPA services via the non-CSG base station, the controller determines that the requirements for connecting the UE to the LIPA services via the non-CSG base station are met if the LIPA accessibility information comprises the APN requested to be accessed by the UE and if the LIPA parameter of the APN is LIPA-Only or LIPA-Conditional, and the controller determines that the requirements for connecting the UE to the LIPA services via the non-CSG base station are not met and an activation of the LIPA services via the non-CSG base station for the UE is rejected if the LIPA accessibility information comprises the APN requested to be accessed by the UE and if the LIPA parameter of the APN is LIPA-Prohibit, and when the device capabilities of the serving base station of the UE do not support the LIPA services via the non-CSG base station, the controller determines that the requirements for connecting the UE to the LIPA services via the non-CSG base station are not met and a PDN GateWay (PGW) for the UE is selected if the LIPA accessibility information comprises the APN requested to be accessed by the UE and if the LIPA parameter of the APN is LIPA-Conditional.

15. The apparatus as claimed in claim 12, wherein:

when the device capabilities of the serving base station of the UE support the LIPA services via the non-CSG base station, when the LIPA accessibility information comprises the APN requested to be accessed by the UE, and when the APN supports LIPA services, the controller determines that the requirements for connecting the UE to the LIPA services via the non-CSG base station are met if the LIPA parameter of the APN is LIPA-Only or LIPA-Conditional, and the controller determines that the requirements for connecting the UE to the LIPA services via the non-CSG base station are not met and rejects activation of the LIPA services via the non-CSG base station for the UE if the LIPA parameter of the APN is LIPA-Prohibit; and when the device capabilities of the serving base station of the UE do not support the LIPA services via the non-CSG base station, the controller determines that the requirements for connecting the UE to the LIPA services via the non-CSG base station are not met and selects a PGW for the UE if the LIPA accessibility information comprises the APN requested to be accessed by the UE and if the LIPA parameter of the APN is LIPA-Conditional.

16. The apparatus as claimed in claim 12, wherein:

when the device capabilities of the serving base station of the UE support the LIPA services via the non-CSG base station and the APN requested to be accessed by the UE supports the LIPA services via the non-CSG base station, the controller determines that the requirements for connecting the UE to the LIPA services via the non-CSG base station are met if the LIPA parameter of the APN is LIPA-Only or LIPA-Conditional, and the controller determines that the requirements for connecting the UE to the LIPA services via the non-CSG base station are not met and rejects to activate the LIPA services via the non-CSG base station for the UE if the LIPA parameter of the APN is LIPA-Prohibit, and when the LIPA accessibility information comprises the APN and the LIPA parameter of the APN is LIPA-Conditional, the controller determines that the requirements for connecting the UE to the LIPA services via the non-CSG base station are not met and selects a PGW for the UE if the device capabilities of the serving base station of the UE do not support the LIPA services via the non-CSG base station.

\* \* \* \* \*